United States Patent [19]

Super et al.

[11] Patent Number: 4,501,797
[45] Date of Patent: Feb. 26, 1985

[54] UNBALANCED ORIENTED MULTIPLE LAYER FILM

[75] Inventors: Scott S. Super; Joseph C. Hsu, both of Neenah; William B. Haffner, Menasha; Jerry F. Jesse, Neenah, all of Wis.

[73] Assignee: American Can Company, Greenwich, Conn.

[21] Appl. No.: 446,009

[22] Filed: Dec. 1, 1982

[51] Int. Cl.³ .............................................. B32B 27/00
[52] U.S. Cl. ................................. 428/349; 264/288.4; 264/290.2; 428/343; 428/354; 428/347; 428/516; 428/520; 428/522; 428/35
[58] Field of Search ............ 428/516, 520, 522, 475.8, 428/476.1, 35, 910, 343, 354, 349, 347; 156/244.11, 244.14; 264/288.4, 290.2

[56] References Cited

U.S. PATENT DOCUMENTS

| | | | |
|---|---|---|---|
| 4,064,296 | 12/1977 | Bornstein et al. | 428/35 |
| 4,188,443 | 2/1980 | Mueller et al. | 428/216 |
| 4,194,039 | 3/1980 | Mueller | 428/213 |
| 4,261,473 | 4/1981 | Yamada et al. | 215/1 C |
| 4,360,550 | 11/1982 | Asakura et al. | 428/516 |
| 4,407,897 | 10/1983 | Farrell et al. | 428/516 |
| 4,410,582 | 10/1983 | Tsunashima et al. | 428/516 |

Primary Examiner—George F. Lesmes
Assistant Examiner—E. Rollins Buffalow
Attorney, Agent, or Firm—Stuart S. Bowie; Thomas D. Wilhelm

[57] ABSTRACT

An unbalanced polymeric film has a plurality of adjacent molecularly oriented layers. The first, second, and third layers are molecularly oriented, and are, respectively (1) polypropylene, (2) anhydride modified polypropylene and (3) a barrier layer of either ethylene vinyl alcohol or nylon or a blend of ethylene vinyl alcohol and nylon. A fourth layer is optionally oriented and serves as a heat sealable layer having good adhesion to the barrier layer. In a more sophisticated structure, the fourth layer is oriented and serves an adhesive layer between the barrier layer and a fifth sealant layer. The fifth layer is then optionally oriented. A process for making the films comprises heating the exterior surfaces of the two surface layers to a temperature between 10° and 100° F. below the respective heat sealing temperature of each of the respective surface layers, stretching the so-heated film, annealing the stretched film, and cooling the annealed film.

8 Claims, 3 Drawing Figures

UNBALANCED ORIENTED MULTIPLE LAYER FILM

BACKGROUND OF THE INVENTION

There have been proposed a plurality of single and multiple layer sheet structures for packaging of products requiring significant functional protection from transmission of gaseous materials into or out of the package through the packaging film. For example, various food type products require barriers to transmission of oxygen, moisture, oils and the like. Numerous conventional single and multiple layer structures have been made to serve this end, with a moderate degree of success. Such structures include, for example, saran coated polypropylene, glassine, and the like. It is known to use multiple layer structures into which may be incorporated a separately formed layer of oriented polypropylene or oriented polyester, as well as functional barrier layers.

While such multiple layer films incorporating an oriented layer do provide certain improvements, they require a multiplicity of manufacturing steps which puts them at a competitive cost disadvantage. Advantageously, though, the functional barrier benefits of the multiplicity of layers does provide overall improved barrier functions.

Other desirable attributes of film packages, and particularly those used for packaging snacks, such as potato chips or corn chips, are related to the appearance and feel of the package; which translates into consumer perception of the package at the point of sale. Particularly desirable perceived attributes are gloss and stiffness.

A highly desirable combination of attributes, then includes functional barrier properties to certain gaseous transmission, and perceived properties of gloss and stiffness.

Various attempts have been made to advantageously utilize the benefits of molecular orientation of films to achieve certain of the desirable properties. A serious problem in these developments has been that each different polymer has its unique required set of heating and stretching conditions. Where certain combinations of layer compositions do not have overlapping conditions conductive to molecular orientation of the multiple layer film, additional provisions must be made for effecting the simultaneous orientation of the plurality of layers. There is no known art which makes the necessary provisions. Absent these provisions, in previous attempts to orient multiple layer films, adjacent layers have developed undesirable stresses at layer interfaces, and cohesive stresses within the layers themselves. These stresses too often have manifested themselves in poor or non-existent layer adhesion at the layer interfaces, and in cracking or hole development in one or more of the layers.

Mueller, U.S. Pat. No. 4,188,443 handles this problem in a 5 layer film by selecting the compositions of the second and fourth layers such that they are above their melt temperature during the orientation process (col. 5 line 43). While this mechanism is successful in relieving the interfacial stresses of the orientation process, only 3 of the 5 layers are truly molecularly oriented, and selection of material compositions for layers 2 and 4 may be severely limited by the melting temperature requirements.

Yamada, U.S. Pat. No. 4,261,473 teaches a balanced 3 layer film, as in his EXAMPLE 10, wherein the outer layers are polyethylene terephthalate and the core layer is EVOH. Sheets of this film are preheated for a lengthy 5 minutes, apparently to reach steady state temperature throughout the film thickness, before the film is stretched by drawing it into a "cup" shaped mold. Indeed, this process is more closely related to conventional thermoforming than to molecular orientation.

Mueller, U.S. Pat. No. 4,194,039 teaches a "balanced" 3-layer film (col. 6 line 23) that is a combination of olefins and olefin blends. The film is made by a plurality of extrusion steps and orientation steps.

Bornstein U.S. Pat. No. 4,064,296 teaches an oriented 3 layer film having EVOH as the core layer. However, in Bornstein's film it is "crucial" (col. 4 line 65) that one of the two outer layers be cross-linked, i.e. by irradation.

It is an object of this invention to provide a multiple layer packaging film material which is economically competitive to make and which has a combination of attributes including, as functional physical properties, high barrier to gaseous transmission through the film, and as perceived properties, high gloss, transparency, and stiffness. Preferably the films are unbalanced in that conventional heat sealing equipment may be used to apply heat to the more heat stable side of the film, driving the heat through the film without undue distortion of the film to effect heat sealing of the layer on the opposite surface of the film. Such unbalanced films are readily adapted for use in conventional packaging equipment to economically package a variety of products.

SUMMARY OF THE INVENTION

The inventors herein have found that certain unbalanced multiple layer polymeric films can be molecularly oriented by proper choices of layer structuring and processing conditions to achieve a transparent, heat sealable, high barrier oriented film. Illustrative of films of this invention is an unbalanced film where the layers are, in order; a first molecularly oriented layer of polypropylene (PP), a second molecularly oriented adhesive layer of polypropylene which is acid anhydride modified (MPP), a third molecularly oriented layer of ethylene vinyl alcohol copolymer (EVOH), and a fourth sealant layer. Optionally, the fourth layer is molecularly oriented. Preferably, the fourth layer comprises carboxy moieties in the polymeric structure; and most preferably, the composition of the fourth layer is chosen from the group consisting of modified ethylene vinyl acetates (MEVA) which include in their structure carboxy moieties, modified low density polyethylenes (MLDPE) which include in their structure carboxy moieties, and ethylene-methylacrylate copolymer (EMA).

In a similar structure, the first, second, and third layers are identical to those respective layers in the structure described above. The fourth layer is a molecularly oriented adhesive layer of anhydride modified polyolefin, such as MPP or modified polyethylene or a modified ethylene copolymer, and a fifth layer functions as the sealant layer. Optionally, in that structure, the fifth layer is molecularly oriented. Preferably, the fifth layer comprises carboxy moieties in the polymeric structure; and most preferably, the composition is chosen from the group consisting of MEVA, acid anhydride modified medium density polyethylene (MMDPE), linear low density polyethylene (LLDPE), ionomer, EMA, ethylene acrylic acid (EAA), and unmodified ethylene vinyl acetate (EVA) having at least 1.5 mole percent vinyl acetate.

Also illustrative of the films of this invention is an unbalanced film where the layers are, in order; a first molecularly oriented layer of PP, a second molecularly oriented adhesive layer of MPP, a third molecularly oriented layer of nylon, and a fourth sealant layer. Optionally, the fourth layer is molecularly oriented. Preferrably, the fourth layer comprises carboxy moieties in the polymeric structure; and most preferrably, the composition is chosen from the group consisting of MEVA, MLDPE, EMA, EAA, and ionomer, wherein the ionomer is a metal salt of ethylene acrylic acid, such as that sold under the tradename Surlyn.

In a similar structure, the first, second, and third layers are identical to those respective layers in the structure last recited above. The fourth layer is a molecularly oriented adhesive layer, and a fifth layer functions as the sealant layer. Optionally, in that structure, the fifth layer is molecularly oriented. Preferably, the fourth layer is an MPP, though others such as MMDPE are contemplated. Also preferably, the fifth layer comprises carboxy moieties in the polymeric structure; and most preferably, the composition is chosen from the group consisting of MEVA, LLDPE, ionomer, EAA, and unmodified EVA having at least 1.5 mole percent vinyl acetate.

In any of the structures recited above, and in combinations thereof, certain advantages are achieved wherein the third layer comprises a blend of nylon and ethylene vinyl alcohol copolymer.

Certain novel aspects of the invention also reside in a method of making an unbalanced, oriented, multiple layer polymeric film, the film having first and second polymeric surface layers on respective surfaces thereof. The first surface layer has a first heat sealing temperature and the second surface layer has a second heat sealing temperature. The novel method of orientation comprises the steps of; heating each of the respective surfaces to a temperature between 10° F. and preferrably between 10° F. To 40° F. below the respective heat sealing temperature of each of the surfaces, stretching the heated, unbalanced, multiple layer film, annealing the stretched film and then cooling the annealed film.

A particularly advantageous embodiment of the method is one wherein the surfaces are heated by passing a continuous sheet of the film over a series of heated rollers. The sheet passes over the heated rollers in such a configuration that each roller contacts only one surface of the film, and the temperature of each roller is controlled so as to apply an appropriate temperature to the surface so contacted.

Preferably, the annealing is done by application of heat to the one surface layer which is more heat stable.

DETAILED DESCRIPTION OF THE PREFERRED EMBODIMENTS

Figure 1:
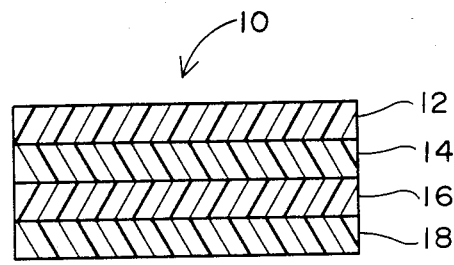
FIG. 1 is a cross-section of a representative 4 layer film of the invention.

Referring now to FIG. 1, the overall film is designated by the numeral 10. Layer 12 is polypropylene. Layer 14 is an adhesive layer of carboxyl modified polypropylene. Layer 16 is a barrier layer of either nylon, ethylene vinyl alcohol or a blend of nylon and ethylene vinyl alcohol. Layer 18 is a heat sealable layer which may be selected with substantial independent judgement, depending on its adhesion requirements to the specific composition of layer 16 and the desired heat sealing temperature.

In the FIG. 1 structure, layers 12, 14, and 16 are all molecularly oriented. Layer 18 is optionally oriented.

Figure 2:
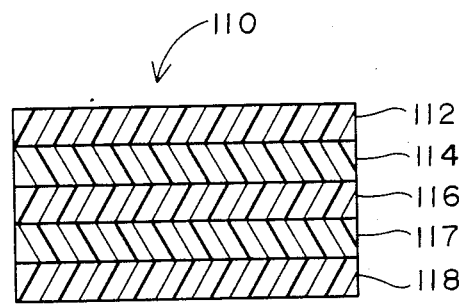
FIG. 2 is a cross-section of a representative 5 layer film of the invention.

Referring to FIG. 2, wherein like 100-series numbers correspond to like layers in FIG. 1, the overall film is designated 110. Layer 112 is polypropylene. Layer 114 is an adhesive layer of carboxyl modified polypropylene. Layer 116 is a barrier layer of either nylon, ethylene vinly alcohol or a blend of nylon and ethylene vinyl alcohol. Layer 117 is an adhesive layer selected for its capabilities to adhere layer 116 to layer 118. Layer 118 is a heat sealable layer.

Figure 3:
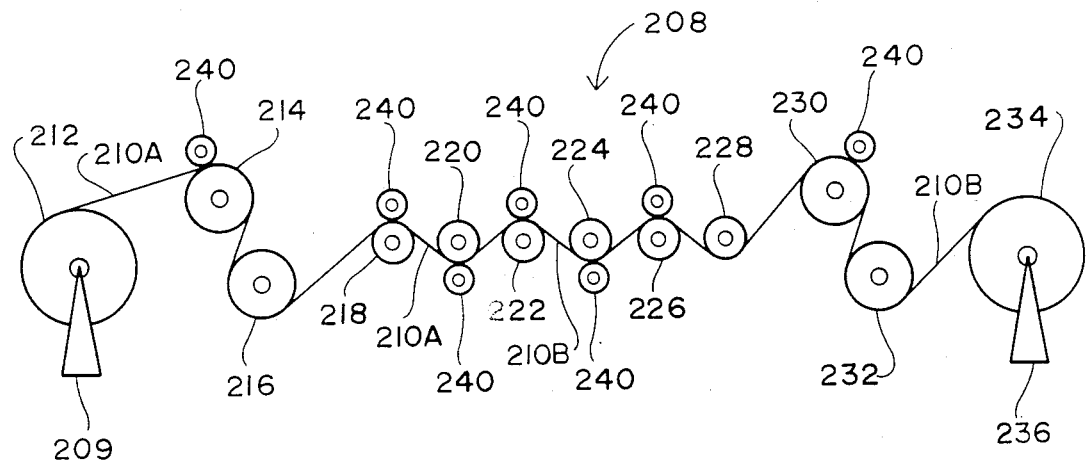
FIG. 3 is an outline of a representative line of processing equipment for carrying out the orientation of multiple layer films of the invention.

Referring now to FIG. 3, the overall layout of the equipment and film is designated 208. The layout includes an unwind station 209 from which is unwound a roll 212 of film 210A. The film first passes over a turning roll 214, from there to a first pre-heat roll 216, and thence is wound over a series of heated rolls 218, 220, 222, 224, 226 and 228. The film is stretch oriented between rolls 220 and 222 as indicated by the designation 210B for the stretched film. The stretched film is annealed on roll 230 and then chilled, or cooled on roll 232. Finally, the stretched film 210B is wound up as a roll 234 on windup station 236.

Upon examination of the overall nature of the film hereinabove described, it is seen that there are disclosed four and five layer films having the combination of at least three layers, and in some cases, as many as all the layers molecularly oriented, and wherein dissimilar polymeric material structures are associated with the several layers. More specifically, not all the layers of the films of this invention need be derivatives of the same family, e.g. polyethylenes, polypropylenes, or even polyolefins. Further, the compositions of the several layers need not have similar melt flow properties so long as they are compatible for coextrusion. Neither is it necessary, and indeed it is not desired, that any of the layers melt during the orientation process, as melting of any given layer would preclude true molecular orientation of that layer. From the perspective of desired physical properties of the overall film, it is generally preferred that all the layers be molecularly oriented. For reasons of facilitating construction of some members of the family of films of the invention, the sealant layer may, or may not, be oriented. For example, in some cases it is preferred to coextrude all the layers of the film except the sealant layer, and to orient the so coextruded multiple layer film. After orientation, the sealant layer, e.g. layer 18 or 118, is then added—for example by solution coating, by extrusion coating, or by heat and pressure lamination of a previously formed film. Other conventional means of adding a sealant layer to a separately formed film are also contemplated.

Definitions:

Certain terms used herein require some clarification as to the intended meaning in order to preclude possible confusion as to their signifcance.

Throughout this teaching, the films of the invention are described as being "unbalanced." Unbalanced refers to the relationships of physical and chemical properties of the polymers relative to the symmetry, or lack thereof, of the film cross-section. In a generally balanced film the properties will be at least similar as one progresses from the two outside surfaces of the film toward the center of the film cross-section. Referring to a five layer balanced film, which could be represented by the structure shown in FIG. 2 (though it is not intended herein to represent that inventive films illustrated by FIG. 2 are balanced), the outer layers such as 112 and 118 would have similar properties, and the next pair of layers such as 114 and 117 would have similar properties. The similarities in a balanced film usually are both chemical, e.g. polymeric structure and composition; and physical, e.g. melting properties, rheology of fluid flow, heat seal temperature, vapor permeation rates and the like. In unbalanced films, and now referring to the inventive films represented by FIG. 2, the outer layers, layers 112 and 118, are dissimilar in at least some properties, usually both chemical properties and physical properties. For example, layer 118 is usually an ethylene copolymer and has a lower melting temperature and a lower heat sealing temperature than the polypropylene of layer 112. While layers 114 and 117 are both adhesive layers, they may or may not be similar. Their selection is based primarily on their capability of adhering to their respective adjoining layers.

The term "polypropylene," as used herein, unless otherwise indicated includes homopolymers and copolymers of propylene. Indeed the processing of the films of the invention is most facile when the polypropylene compositions used are those containing 2% to 3.5% ethylene.

The term "carboxy moieties" refers to a plurality of functional group derivatives of carboxylic acids in the compound which include components such as

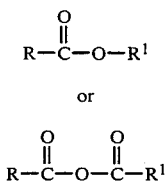

Illustrative of such carboxy structures are organic acids and acid salts, esters, and anhydrides.

The term "molecularly oriented" refers to the realignment of the amorphous and/or crystaline structure of polymeric film by any process which simultaneously reduces the film thickness and elongates its dimension in at least one direction; all while the film is in a heated, but unmelted state. Specifically, "molecular orientation" does not include those processes that stretch the polymer when it is in a softened, or plastic, state, such as in thermoforming and blow-molding.

The phrase "heat sealing temperature" refers to that temperature, or range of temperatures at which films of certain polymers are susceptible to being sealed to themselves in face-to-face relationship by application of heat and pressure in conventionally known manner.

The term "annealing" refers to a step of temporarily holding a film at an elevated temperature under controlled levels of tension. This known process provides a degree of stability to a stretched film after it is cooled and improves performance characteristics.

Returning now to the invention in detail, layers 12 and 112 are advantageously polypropylene, and provide tough, outer surfaces of the films. In the oriented state, the polypropylene is exceptionally more glossy and transparent.

Layers 14 and 114 are usually anhydride modified polypropylene. Illustrative of specific polymers useful for layers 14 and 114 are the Admers sold by Mitsui Company, Japan, under the tradenames Admer QF300, Admer QF500, and Admer QF500X.

Layers 16 and 116 serve as a barrier to transmission of oxygen through the film. Acceptable barrier layer materials are EVOH, nylon, and blends of EVOH and nylon. Preferred compositions are the blends containing at least 20% nylon, as these structures are most successfully produced with acceptable levels of adhesion at all the layer interfaces after orientation.

Layers 18 and 118 are sealant layers comprising heat sealable compositions. The 4-layer configuration of FIG. 1 is simpler in structure, and can usually be made with simple processing equipment. It has the disadvantage that the composition of layer 18 must serve double duty by not only having heat sealing properties at a desired temperature but also having a capability of adhering to layer 16 with good levels of adhesion after orientation.

The 5-layer configuration of FIG. 2 is sometimes preferred, however, when there is no identifiable polymer composition which will both adhere to the barrier layer and be heat sealable at the desired temperature. The use of the additional layer 117 allows more freedom in selection of the composition for the sealant layer, by introducing an adhesive layer 117 which adheres well to both layers 116 and 118, and need not have the heat sealing characteristics required for layer 118.

Thus, in the FIG. 1 structure wherein layer 16 is EVOH, the sealant layer composition is preferrably MLDPE, MMDPE, MEVA or EMA. When layer 16 is nylon, the sealant layer composition may be MLDPE, MMDPE, MEVA, EMA, EAA, or ionomer.

In the FIG. 2 structure whether layer 116 is EVOH, nylon, or a blend of EVOH and nylon, it is possible to select the composition of adhesive layer 117 such that the sealant layer composition may be selected with greater freedom. Illustrative of suitable sealant layer compositions are MEVA, LLDPE, ionomer, EMA, EAA, or EVA having at least 1.5 mole percent vinyl acetate.

The most common problem in producing oriented multiple layer films of the nature disclosed herein is serious reduction, or failure of adhesion at the layer interfaces. In the structures disclosed herein, the interface most sensitive to adhesion problems is the interface between the barrier layer i.e. 16 or 116, and the adjacent layer—either layer 18 or layer 117. Particularly where the four-layer structure, as in FIG. 1, has all four layers oriented, the interfacial adhesion between layers 16 and 18 is quite sensitive to proper selection of layer 18 composition (particularly where the barrier layer 16 is EVOH). In that construction, wherein all four layers are oriented, the sealant layer composition must contain functional group derivatives of carboxylic acids and preferably anhydride derivatives. Where layer 18 is not oriented, such strict selection of the sealant layer composition is not so important.

In understanding the process of the invention, it is significant to understand that the compositions defined for sealant layers 18 and 118 respond to thermal stimuli at substantially lower temperatures than other layers of the film, and particularly the layers 12 and 112 and the layers 16 and 116. Significantly, the inventors have found that by applying heat to each surface separately, and at a temperature selected to be compatible with the orientation of the composition of that layer, and by applying that heat to each surface for a moderate period of time, the multiple layer films of this invention may be oriented; and indeed, an unbalanced film having up to five layers and wherein the several layers need not be derived from the same polymer family, can be molecularly oriented without necessarily incurring splitting, pin-holing, or fusion of any one layer.

As the amount of stretch successfully achieved is increased, while maintaining adequate levels of interlayer adhesion, the desirable properties of the film are enhanced. As the amount of stretch is increased, however, the adhesions at certain of the interfaces decreases. Thus, the selection of the best orientation ratio for any given film is dependent upon the specific film structure and the interlayer adhesion levels required by the intended end use of the film. For most packaging applications, interlayer adhesion levels must be at least 50 grams per inch width, as measured by ASTM D903. For films contemplated by this invention, and considering the adhesion levels required, satisfactory orientation levels are normally between 3/1 and 4/1. The lower orientation ratios generally apply to structures having EVOH in either layer 16 or 116 and wherein all the layers are simultaneously oriented. The higher orientation ratios are achieved where the barrier layer (16 or 116) contains some nylon and where the sealant layer may not be oriented. In this illustration, then, typical machine speeds during and after stretching are on the order of 180 to 320 feet per minute.

The heat applied to each of the surface layers, e.g. 12 and 18, is applied to the surface layers as they alternate contacting alternative ones of the temperature-controlled rolls.

As an illustration, consider the processing through equipment of FIG. 3 of a four layer film as in FIG. 1, wherein layer 16 is EVOH and layer 18 is MEVA. The film 210A is unwound from unwind station 209 at a speed of 60 to 80 feet per minute with the polypropylene layer 12 on the bottom surface of the film such that the polypropylene layer contacts the turning roll 214, which is kept at room temperature, or about 70° F. The film then progresses to the first pre-heat roll 216 which is temperature controlled at 140°-185° F., and where layer 18 is against roll 216 and receives initial pre-heating. At the next pre-heat roll, 218, which is temperature controlled at 190°-220° F., the polypropylene layer 12 contacts the pre-heat roll, and receives its initial direct-contact pre-heating. Layer 18 receives additional pre-heating at roll 220 which is temperature controlled at 170° F. The film is then stretched between rolls 220 and 222. This is accomplished by driving roll 222 faster than roll 220 and controlling the difference in drive speeds to effect the desired amount of stretch, hereinafter referred to as the orientation ratio—that being the fractional ratio of the driving speeds of the rolls 220 and 222.

After the film is stretched between rolls 220 and 222, it is designated 210B, as shown between rolls 222 and 224. Roll 224 is again temperature controlled, in this illustration at 170° F., the same as rolls 220, and roll 226 and 228 are controlled at 180°-190° F. The film is then annealed by contacting annealing roll 230, which roll is temperature controlled at 220°-250° F. After annealing, the film is cooled by chill roll 232, and is subsequently wound up in a roll 234 at wind up station 236.

In terms of heating contact time, the film is in contact with pre-heat rolls 216 for about 1.8-4 seconds, and roll 218 and 220 for about 0.9-3.2 seconds. Contact time on rolls 222, 224, 226 and 228 is about 0.3-0.8 seconds each. Contact time on rolls 230 and 232 is about 0.6-1.0 seconds. Also significant to the process is good control of the film speed and contact on all rollers at all stages of the operation. Thus nip rolls 240 are used at several locations along the processing line as shown in FIG. 3.

EXAMPLE 1

A four layer film, 6 mils thick, was coextruded by the cast coextrusion process, and wound up. Using the framework of the FIG. 1 structure layer 12 was polypropylene; layer 14 was anhydride modified polypropylene. Layer 16 was EVOH. Layer 18 was MEVA. In terms of bulk ratios, expressed as layer thickness, layer 18 was 25% of the film thickness, layer 16 was 10%; layer 14 was 10% and layer 12 was 55%.

The coextruded film was then oriented at a 3/1 ratio, where the unwind speed was 60 feet per minute and the wind-up speed was 180 feet per minute. The roll temperatures were as follows: Roll 216 was 185° F. Rolls 220, and 224, 226, and 228 were 185° F. Roll 230 was 250° F. Rolls 218 and 222 were 210° F.

EXAMPLE 2

A four layer film, 8 mils thick was coextruded by the cast coextrusion process, and wound up. Using the same framework of the FIG. 1 structure, layer 12 was polypropylene. Layer 14 was anhydride modified polypropylene. Layer 16 was nylon 6. The sealant layer was a surlyn ionomer. In terms of bulk ratios, expressed as layer thickness, layer 18 was 25% of the film thickness; layer 15 was 10% layer 14 was 10% and layer 12 was 55%.

The so coextruded film was then oriented at a 3.5/1 ratio, where unwind speed was 70 feet per minute and the wind-up speed was 245 feet per minute. Roll 216 was 140° F. Rolls 220 and 224 were 160° F. Rolls 226 and 228 were 185° F. Roll 230 was 220° F. Rolls 218 and 222 were 200° F.

EXAMPLE 3

A five layer film, 6 mils thick was coextruded by the cast coextrusion process, and wound up. Using the framework of FIG. 2, layer 112 was polypropylene; layers 114 and 117 were anhydride modified polypropylene. Layer 116 was EVOH. Layer 118 was LLDPE. In terms of bulk ratios, expressed as layer thickness, layer 118 was 20% of the film thickness; layers 114 and 117 were each 10%; layer 116 was 10%; and layer 112 was 50%.

The so coextruded film was then oriented at a 3.5/1 ratio, using the same processing conditions as in EXAMPLE 1.

EXAMPLE 4

A five layer film, 8 mils thick was coextruded and wound-up. The film structuring was the same as in EXAMPLE 3 except that layer 116 was nylon 6.

The so coextruded film was oriented at a 4/1 ratio, using the same processing conditions as in EXAMPLE 1.

EXAMPLE 5

A four layer film, 6 mils thick was coextruded and wound-up. The film structuring was the same as in EXAMPLE 1 except that layer 16 was a blend consisting of 70% EVOH and 30% nylon.

The so coextruded film was oriented at a 4/1 ratio, using the same processing conditions as in EXAMPLE 1.

In the following Table 1, the interlayer adhesion levels, after orientation, are shown for each of the above examples.

TABLE 1

| Example No. | Layer 12 or 112 | Adhesion[1] | Layer 14 | Adhesion[1] | Layer 16 or 116 | Adhesion[1] | Layer 17 or 117 | Adhesion[1] | Layer 18 or 118 |
|---|---|---|---|---|---|---|---|---|---|
| 1 | PP | CNS | MPP | 275 | EVOH | 79 | MEVA | | |
| 2 | PP | CNS | MPP | 107 | Nylon 6 | CNS | Surlyn | | |
| 3 | PP | CNS | MPP | 90 | EVOH | 66 | MPP | 141 | LLDPE |
| 4 | PP | CNS | MPP | 100 | Nylon 6 | 60 | MPP | 140 | LLDPE |
| 5 | PP | CNS | MPP | 177 | Nylon EVOH Blend | 64 | MEVA | | |

CNS = cannot separate
[1]Interlater adhesion in grams per inch width

It will be seen from the examples given that the heating temperatures are selected, and different, for each of the film surfaces. Thus there is created a temperature differential between the two film surfaces, and the temperature differential is maintained during the orientation and briefly after the orientation process, pending the controlled cooling of the oriented film by the chill roll.

It will be appreciated that the disclosure herein identifies a relatively large family of oriented multiple layer structures, and processes for making them. It will also be appreciated that successful performance of the process depends on appropriate adjustment of the various independent variables, within the teaching herein, such as stretch ratio, line speeds and temperatures of each of the rolls.

Skilled artisans find that, with modest amounts of experimentation, adequate levels of adhesion can be maintained through the orientation process, for the family of structures defined herein.

Having thus described the invention, what is claimed is:

1. An unbalanced multiple layer polymeric film having two outer surfaces, and wherein the interfacial adhesion at each layer interface is at least 50 grams per inch width, the layers comprising, in order through the film:
   (a) a first molecularly oriented layer of polypropylene;
   (b) a second molecularly oriented adhesive layer of anhydride modified polypropylene;
   (c) a third molecularly oriented layer of ethylene vinyl alcohol copolymer; and
   (d) a fourth heat sealable layer; orientation of said film having been accomplished by applying heat to each of said outer surfaces in different amounts, thus creating a temperature differential between said surfaces, and effecting said orientation during the existence of said temperature differential.

2. An unbalanced multiple layer film as in claim 1 wherein said fourth layer is molecularly oriented and wherein the composition of said fourth layer comprises carboxy moieties in the polymer structure.

3. An unbalanced multiple layer film as in claim 1 wherein the composition of said fourth layer comprises carboxy moieties in the polymeric structure.

4. An unbalanced multiple layer polymeric film as in claim 1 wherein the composition of said fourth layer is chosen from the group consisting of anhydride modified ethylene vinyl acetate, anhydride modified low density polyethylene, anhydride modified medium density polyethylene, and ethylene methylacrylate copolymer.

5. An unbalanced multiple layer polymeric film having two outer surfaces, and wherein the interfacial adhesion at each layer interface is a least 50 grams per inch width, the layers comprising, in order through the film:
   (a) a first molecularly oriented layer of polypropylene;
   (b) a second molecularly oriented adhesive layer of anhydride modified polypropylene;
   (c) a third molecularly oriented layer of ethylene vinyl alcohol copolymer;
   (d) a fourth molecularly oriented adhesive layer of anhydride modified polyolefin; and
   (e) a fifth heat sealable layer; orientation of said film having been accomplished by applying heat to each of said outer surfaces in different amounts, thus creating a temperature differential between said surfaces, and by effecting said orientation during the existence of said temperature differential.

6. An unbalanced multiple layer film as in claim 5 wherein said fifth layer is molecularly oriented.

7. An unbalanced multiple layer film as in claim 5 wherein the composition of said fifth layer comprises carboxy moieties in the polymeric structure.

8. An unbalanced multiple layer film as in claim 7 wherein the composition of said fifth layer is chosen from the group consisting of anhydride modified ethylene vinyl acetate, linear low density polyethylene, ionomer, ethylenemethylacrylate, ethylene acrylic acid, and unmodified ethylene vinyl acetate having at least 1.5 mole percent vinyl acetate.

* * * * *